W. C. ANDERSON.
FRUIT DISTRIBUTING APPARATUS FOR CANNING TABLES.
APPLICATION FILED MAR. 13, 1908.
920,712.
Patented May 4, 1909.
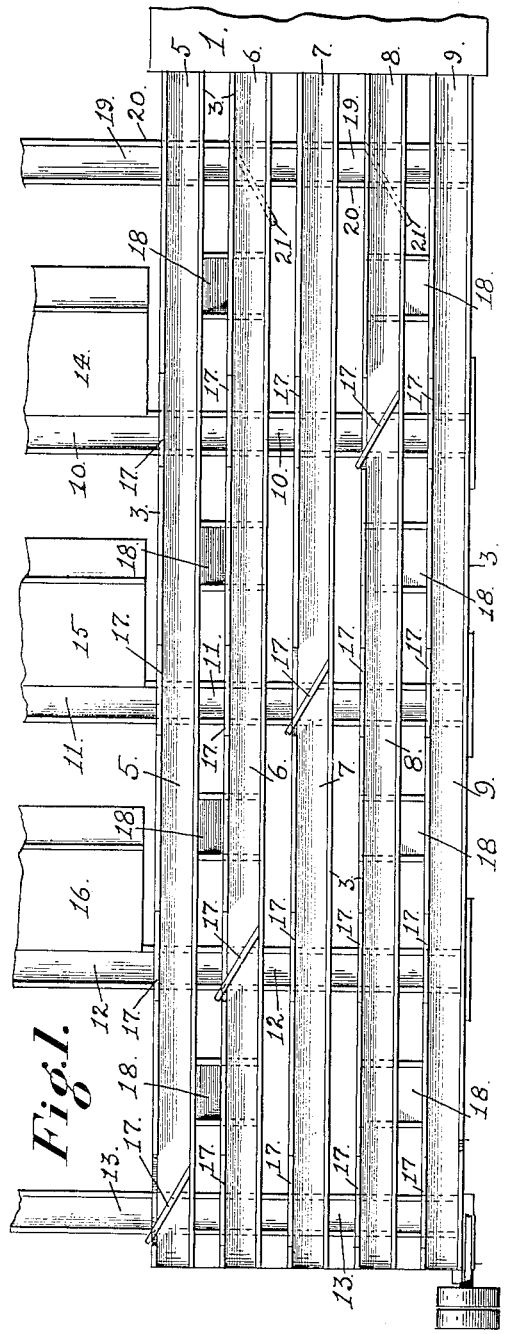
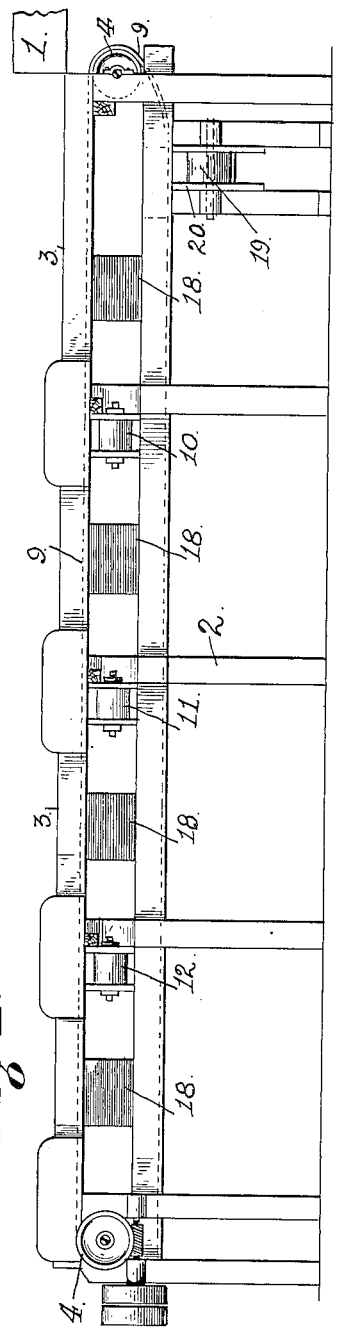
WITNESSES.
INVENTOR.
William C. Anderson
by Wm. F. Booth
his Attorney.

UNITED STATES PATENT OFFICE.

WILLIAM C. ANDERSON, OF SAN JOSE, CALIFORNIA, ASSIGNOR TO ANDERSON-BARNGROVER MFG. CO., OF SAN JOSE, CALIFORNIA, A CORPORATION OF CALIFORNIA.

FRUIT-DISTRIBUTING APPARATUS FOR CANNING-TABLES.

No. 920,712.      Specification of Letters Patent.      Patented May 4, 1909.

Application filed March 13, 1908. Serial No. 420,872.

*To all whom it may concern:*

Be it known that I, WILLIAM C. ANDERSON, a citizen of the United States, residing at San Jose, in the county of Santa Clara and State of California, have invented certain new and useful Improvements in Fruit-Distributing Apparatus for Canning-Tables, of which the following is a specification.

My invention relates to a distributing apparatus which is especially intended for the handling of a plurality of grades of fruit, as they come from the grader, and their disposal at the different canning-tables.

Though my apparatus is applicable to the distribution of grades of various materials, and particularly of fruit, its utility may be best illustrated by describing it in connection with such fruit, say peaches, which have been previously halved, pitted and peeled, and which are then required to be separated into grades, and each grade separately canned at the tables.

It is the object of my apparatus to take the several grades of peaches directly from the grading machine, and by an arrangement of carriers, convey each grade to its own appropriate canning table, or to blend or combine two or more grades upon any one table, as may be desired.

With this object in view, my invention consists in the novel arrangement of carriers and switch gates, which I shall now fully describe, by reference to the accompanying drawings in which—

Figure 1 is a plan of my distributing system. Fig. 2 is a side elevation of the same.

1 may indicate any suitable grader in which the different sizes of the fruit are separated and by which they are delivered separately.

2 is a frame in which, between walls 3, a plurality of endless, traveling, parallel carriers are mounted on suitable terminal drums 4, to one of which motion is imparted to drive said carriers. There are as many of these carriers as there are grades of the fruit, say, five, as here shown, numbered, respectively, 5, 6, 7, 8 and 9, and it is to be supposed that each is disposed relatively to the grader 1 in such manner as to receive its appropriate grade. Below the upper courses of these carriers, and suitably mounted, are the traveling cross-carriers, which should also be five in number, though four only are here shown, numbered respectively, 10, 11, 12 and 13. Each of these cross-carriers leads to a canning table, of which three only are here shown, indicated by 14, 15 and 16.

In the inner wall 3 of each main-carrier is a gate-way adapted to be opened and closed by a swinging switch-gate 17. The gates are directly above the cross-carriers and when in use are adapted to be turned diagonally across the main-carriers in order to divert the fruit through the gate-way, so that it will fall upon the underlying cross carrier.

18 are hoppers, the mouths of which are exposed in the spaces between the walls of the main-carriers and the lower ends are disposed to deliver the fruit which is given to them, to and upon the returning courses of the main-carriers. I have here shown these hoppers arranged to deliver to the lower courses of carriers 6 and 8, though this is not essential, as any one or more of the carriers could be thus utilized.

Under the head ends of the lower courses of the main carriers is a cross-carrier 19 with side walls 20 and switch-gates 21, to divert such fruit as may be on the return courses of carriers 6 and 8, to and upon the cross-carrier 19, which may be supposed to extend to some destination or machine where the fruit thus conveyed will be properly disposed of.

The operation of the distributing apparatus is as follows:—One grade of peaches will be delivered to carrier 5, and, in the arrangement shown, it will be conveyed to the open switch-gate 17 above the cross-carrier 13, and will, by said gate, be discharged upon said cross-carrier, by which it will be conveyed to its appropriate table, not here shown. Another grade will be delivered to carrier 6, and will be diverted, by its open gate, to and upon the cross-carrier 12, which will convey it to the table 16. Another grade will be delivered by main carrier 7 to cross-carrier 11, and thence will be conveyed to table 15. Another grade will be conveyed by its carriers 8 and 10 to table 14. The last grade will be similarly conveyed by its carrier 9 to its appropriate cross-carrier and table. Thus each grade will find its own table. But it frequently happens that it is advisable for two or even more grades to be blended or combined on the same table. This can be readily effected as follows:—Suppose it be desired to combine the grades of carriers 6 and 7. All that is necessary is to close the gate shown open on carrier 7 and open the gate of said carrier which lies over cross-carrier 12. Then both carriers 6 and 7 will deliver to cross-carrier 12 and both grades will go to table 16. These instances need not be descriptively multiplied, as it will readily be seen that by the arrangement of gates here shown, each grade can be delivered to any table, and two or more or all the grades can be delivered to any table or tables, or the blending of any grades may be had on any table, at will. As the fruit is conveyed along on the main-carriers, the operators pick out the culls and defective and imperfect specimens, and throw them into the most convenient of the hoppers 18. The specimens fall on the lower courses of the main carriers and are conveyed back to the cross carrier 19, by which they are taken to some destination at which they are properly disposed of.

Having thus described my invention, what I claim as new and desire to secure by Letters Patent is:—

1. An apparatus for distributing graded fruit to canning tables, comprising a plurality of traveling main-carriers, one for each grade, a plurality of cross-carriers, underlying the main-carriers, one for each canning table, and a plurality of switch-gates for each main-carrier, arranged to divert the fruit therefrom to any cross-carrier.

2. In a fruit distributing apparatus, the combination of an endless, traveling main-carrier upon the upper course of which the fruit is conveyed, a second carrier under the return course of the main carrier, and means for diverting fruit thrown upon said return course of the main-carrier, to and upon the second carrier.

3. In a fruit distributing apparatus, the combination of an endless, traveling main-carrier upon the upper course of which the fruit is conveyed, a second carrier under the return course of said main-carrier, a hopper the mouth of which is exposed in the space to one side of the upper course of the main-carrier and its discharge end is disposed to deliver the fruit passed through it, to the return course of said main-carrier, and means for diverting said fruit from the return course of said main-carrier, to and upon the second carrier.

4. An apparatus for distributing graded fruit to canning tables, comprising a plurality of endless, traveling main-carriers, one for each grade, a plurality of cross-carriers, underlying the upper courses of the main-carriers, one for each canning table, a plurality of switch-gates for each main-carrier, arranged to divert the fruit therefrom to any cross-carrier, a cross-carrier under the return courses of the main carriers, and means for diverting fruit thrown upon the return courses of the main-carriers, to and upon said last-named cross-carrier.

5. An apparatus for distributing graded fruit to canning tables, comprising a plurality of endless, traveling main-carriers, one for each grade, a plurality of cross-carriers underlying the upper courses of the main carriers, one for each canning table, a plurality of switch-gates for each main-carrier, arranged to divert the fruit therefrom to any cross-carrier, a cross-carrier under the return courses of the main-carriers, hoppers the mouths of which are exposed in the spaces between the main-carriers and their discharge ends are disposed to deliver fruit thrown into them, to the return courses of the main-carriers, and means for diverting said fruit from said return courses, to and upon said last-named cross-carrier.

In testimony whereof I have signed my name to this specification in the presence of two subscribing witnesses.

WILLIAM C. ANDERSON.

Witnesses:
  WM. F. BOOTH,
  D. B. RICHARDS.